United States Patent [19]

Mozumder et al.

[11] Patent Number: 5,408,405
[45] Date of Patent: Apr. 18, 1995

[54] MULTI-VARIABLE STATISTICAL PROCESS CONTROLLER FOR DISCRETE MANUFACTURING

[75] Inventors: Purnendu K. Mozumder, Plano; Sharad Saxena, Dallas; William W. Pu, Plano, all of Tex.

[73] Assignee: Texas Instruments Incorporated, Dallas, Tex.

[21] Appl. No.: 124,083

[22] Filed: Sep. 20, 1993

[51] Int. Cl.[6] .................... G06F 15/46; G05B 13/04
[52] U.S. Cl. ................................. 364/151; 364/468; 364/552
[58] Field of Search ............... 364/151, 468, 552, 149, 364/551.01, 554, 578

[56] References Cited

U.S. PATENT DOCUMENTS 3,751,647  8/1973  Maeder et al. .................... 364/151
5,196,997  3/1993  Kurtzberg et al. ................. 364/152

OTHER PUBLICATIONS

*The Process Control Systems in Sub-0.5 Micron Factories*, P. K. Mozumder, presented at International Symposium on Semiconductor Manufacturing in Austin, Tex., Sep. 20, 1993.
*A Monitor Wafer Based Controller for PECVD Silicon Nitride Process on AMT*, P. K. Mozumder, et al., IEEE/-SEMI Advanced Semiconductor Manufacturing Conference, Presented Oct., 1993, pp. 136-141.

*Primary Examiner*—Paul P. Gordon
*Attorney, Agent, or Firm*—Ruben C. DeLeon; James C. Kesterson; Richard L. Donaldson

[57] ABSTRACT

A method and system for controlling a plurality of process control variables for processing discrete products is described. The method comprising: utilizing process models relating a plurality of product quality parameters to the plurality of process control variables; measuring the plurality of product quality parameters on a first plurality of products; exercising statistical quality control tests on the plurality of product quality parameters of the first plurality of products; continuing processing if statistical quality control tests are successful; otherwise measuring the plurality of product quality parameters on a second plurality of products; tuning the process models to create tuned process models using the plurality of product quality parameters from the second plurality of products, wherein the tuning estimates a changed state of the processing; estimating new values for the plurality of process control variables from the tuned models; processing a third plurality of products at the new values of the plurality of process control variables; measuring the plurality of product quality parameters on the third plurality of products; repeating the tuning of the process models and the estimating new values for the plurality of process control variables if the quality control parameters from the third plurality of products are not acceptable; otherwise continuing processing products with the new values of the plurality of process control variables if the quality control parameters from the third plurality of products are acceptable.

20 Claims, 4 Drawing Sheets

MULTI-VARIABLE STATISTICAL PROCESS CONTROLLER FOR DISCRETE MANUFACTURING

FIELD OF THE INVENTION

This invention generally relates to a multi-variable computerized controller for manufacturing of discrete products.

BACKGROUND

Manufacturing of many types of discrete products can benefit from multi-variable computerized controllers. The semiconductor wafer processing area is an example of an area of particular interest. The small feature sizes and the large number of steps required to fabricate state of the art integrated circuits (on semiconductor wafers) make it essential that each of the process steps meet a tight set of specifications. Since process variations are inevitable, statistical process control (SPC) is one of the techniques used for controlling fabrication processes. Often, implementing SPC on a wafer-by-wafer basis requires having equipment with in-situ sensors for measuring the desired quality characteristics, or making changes to existing equipment to incorporate in-situ sensors. Obtaining new equipment with in-situ sensors or modifying existing equipment can be expensive. In addition to the cost of the sensors, adding sensors to existing equipment can cause expensive downtime and decrease mean time between failure (MTBF).

SUMMARY OF THE INVENTION

The present invention overcomes the above outlined problems and is described in relation to semiconductor manufacturing processes. The process control technique described in the present invention does not require in-situ sensors; however, it is general enough to be applied with or without in-situ sensors. The SPC technique described uses periodic ex-situ measurements made on selected wafers to tune/adapt process models (process models are models relating process inputs and process outputs). The tuned process models are used to adjust the process recipe (settings of variables) to keep the process outputs within specifications.

The controller uses quantitative response surface models (RSMs) of the process. The RSMs are constructed by conducting designed experiments on the equipment. Furthermore, the controller is told about the likely modes of drift in the input delivery systems. For instance, a miscalibration of a mass flow controller (MFC) causes the delivered gas flow to be different from the desired flow by a constant gain. Similarly, improper positioning of the electrodes in a plasma reactor may cause the electrode spacing to be offset from the desired spacing. By making measurements on the selected wafers and observing the statistical quality control (SQC) charts, it is determined whether the process needs adjustment. If the process must be adjusted, the controller uses the measurements made on the selected wafers (monitor wafers) to estimate the shift in each of the input settings. Estimating and quantifying the shifts is performed by the method of model tuning. The tuned models capture the changed state of the process and equipment and are utilized by a sequential optimizer to automatically adjust the recipe. If the adjusted recipe results in an acceptable product, it is used for future wafers, otherwise the process of estimating the equipment state is continued, until another SQC failure is encountered.

A method and system for controlling a plurality of process control variables for processing discrete products is described. A method and system for controlling a plurality of process control variables for processing discrete products is described. The method comprising: utilizing process models relating a plurality of product quality parameters to the plurality of process control variables; measuring the plurality of product quality parameters on a first plurality of products; exercising statistical quality control tests on the plurality of product quality parameters of the first plurality of products; continuing processing if statistical quality control tests are successful; otherwise measuring the plurality of product quality parameters on a second plurality of products; tuning the process models to create tuned process models using the plurality of product quality parameters from the second plurality of products, wherein the tuning estimates a changed state of the processing; estimating new values for the plurality of process control variables from the tuned models; processing a third plurality of products at the new values of the plurality of process control variables; measuring the plurality of product quality parameters on the third plurality of products; repeating the tuning of the process models and the estimating new values for the plurality of process control variables If the quality control parameters from the third plurality of products are not acceptable; otherwise continuing processing products with the new values of the plurality of process control variables if the quality control parameters from the third plurality of products are acceptable.

The method and system can also indicate a preference for the order in which the process control variables are to be adjusted.

The method and system can also include weighting the plurality of product quality parameters corresponding to their relative importance.

The sensors can be ex-situ as well as in-situ.

The invention is described in reference to semiconductor wafer manufacturing, but can be applied to virtually any kind of discrete manufacturing. The process and system described is versatile and can adapt to manufacturing various products where a multitude of variables need to be controlled to produce a product with certain measurable parameters.

BRIEF DESCRIPTION OF THE DRAWINGS

The foregoing and further aspects of the invention are illustrated in the accompanying drawings wherein like elements are denoted by like reference designators and in which.

DETAILED DESCRIPTION OF THE PREFERRED EMBODIMENTS

The preferred embodiments describe a monitor wafer controller for a plasma enhanced chemical vapor deposition (PECVD) of silicon nitride (PECVD Nitride). This process is used for depositing a protective overcoat on integrated circuits. A number of measures pertaining to the quality of the deposited film need to be controlled. This description is not meant to limit the invention to this process. The AMT 5000 reactor made by Applied Materials was used for running the process. It is to be understood that the scope of the invention also comprehends embodiments different from those described, yet within the scope of the claims. Specifically, the invention could be used with any multi-variable controller for discrete manufacturing.

This invention relates to a monitor wafer (test wafer) based controller for semiconductor processing. Using model based SQC, the controller compares product parameter measurements to model predictions to determine whether the process and equipment have changed state (models relate the process quality measures to process inputs). If a change in state is deduced from the measurements, a model tuner is activated which adapts the model to the new state. To tune the model, a local experiment design technique is applied that perturbs the equipment settings to provide sufficient degrees of freedom to over constrain the tuning problem. Finally, a sequential optimization is utilized. This process determines the new settings, while incorporating the user's desire to define and utilize "levels" of controllability associated with the equipment settings.

An advantage of the proposed approach is that no equipment changes are necessary for controlling the process. The technique can be used with existing equipment and does not interfere with routine operations, except for the one-time effort of conducting design experiments to construct process models, and the periodic measurement of selected wafers for monitoring the desired quality characteristics. These measured wafers are called monitor wafers. The key assumption of the approach is that the process does not shift significantly between two consecutive sets of monitor wafers. If the process does shift significantly between monitor wafers, then some, or all, of the wafers between the process shift and the next set of monitor measurements may be outside specifications. This problem can be alleviated by setting the frequency of monitor measurements depending upon the likelihood of process shifts. Fewer measurements will be needed for processes that go out of specification over a longer period of time than a less stable process.

Figure 1:
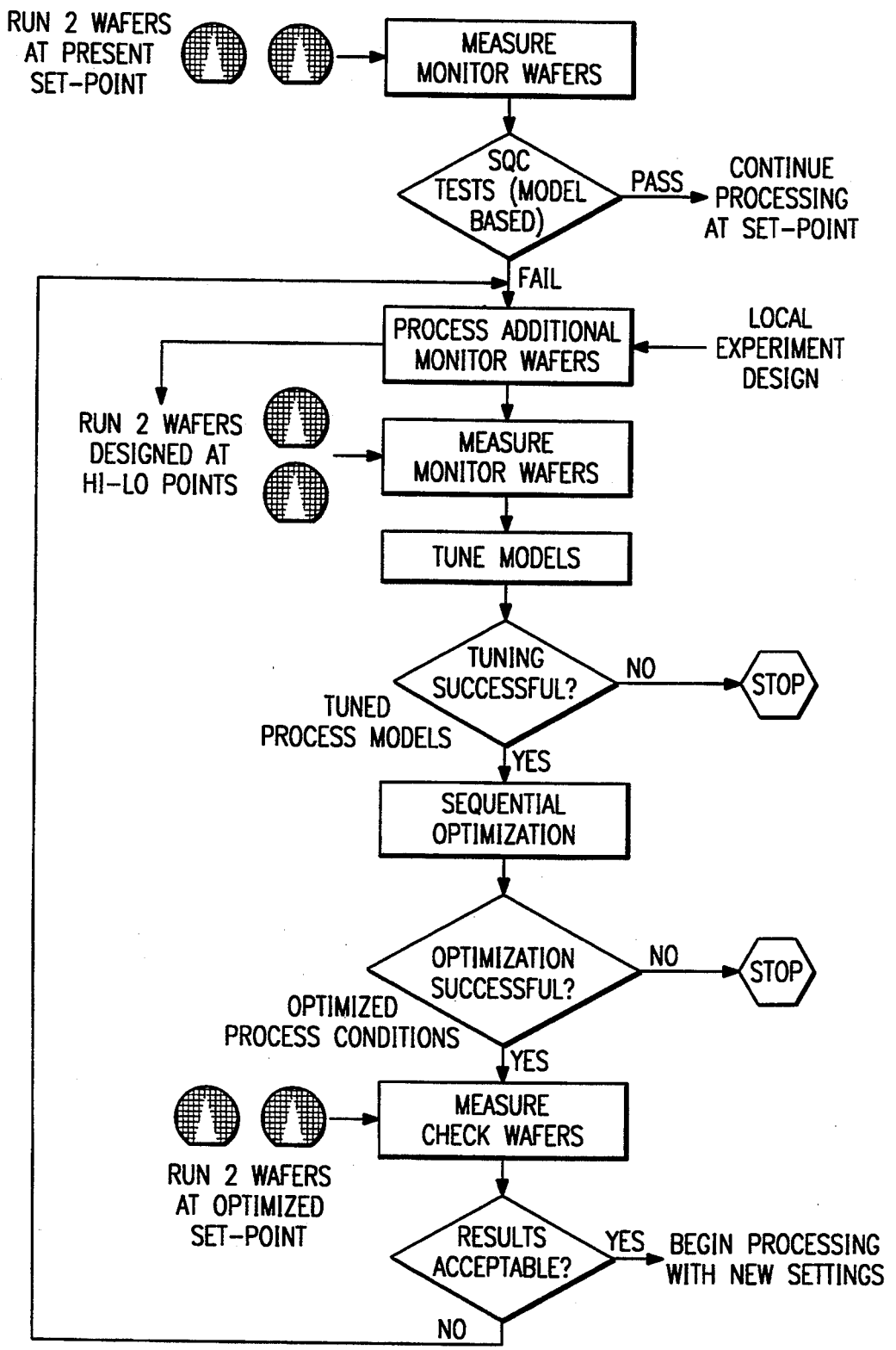
FIG. 1 is a flow chart of the preferred embodiment.

A goal of the monitor wafer based control strategy is to determine if the equipment and/or process state has changed from its previous estimate based on the monitor wafers, and if so, determine a set of corrections to the equipment settings to generate a new process recipe and bring the product quality characteristics on target. The combined equipment and process state (henceforth referred to as the process state) is embedded in the process models. A prerequisite for the monitor based controller is the presence of good process models (e.g. models that map the equipment settings to the product parameters to be controlled). The flow chart of the controller is shown in FIG. 1. The techniques for sensing process state changes (SQC methods), adapting the models to the new state (model tuning), and determining the new settings to correct for the state change (sequential optimization) is later discussed in further detail.

The controller concludes that the process state has changed if the model predictions for the given equipment settings are statistically different from the measured values of the monitor wafers. The procedure used to test the hypothesis that the process state is significantly different from the state represented by the model is termed as model based SQC. Based on the distribution of the error in the model predictions, the probability of observing the discrepancy between the monitor wafer data and the model predictions is determined. If the probability of observing such a deviation is significantly small, then the process is assumed to be in a state different from what the model represents. The likelihood of errors in model predictions are determined during the model fitting (regression) using error analysis techniques, such as ANOVA (analysis of variance). The difference between the model predictions and actual measurements are plotted on a SQC chart to view and determine SQC failures. The limits on the SQC charts are determined from the moments (usually the mean and standard deviation) of the model prediction errors. For the PECVD Nitride process there are six adjustable equipment settings: $N_2$ flow, $SiH_4$ flow, $NH_3$ flow, pressure, RF power, and the electrode gap. Four product parameters are measured: film deposition rate, index of refraction, stress, and thickness non-uniformity. A SQC failure based any of the four parameters signifies a state change, which in turn activates the model adaptation and process optimization. Although an univariate SQC scheme is used for simplicity, the model adaptation and the optimization algorithms use all four output models in conjunction to estimate the new process state and optimal equipment settings.

Estimating the state of the process and updating the models to adapt to the new state, based on the measurements of the product parameters from monitor wafers, is termed model tuning (tuning for short). Model tuning can be accomplished by either updating only the constant term of the model (bias tuning) or by using a multivariable scheme to update the coefficients. Any of the various bias tuning schemes well known in the art may be utilized. In this controller, a multi-variable update scheme is used to adapt the models to the new process and equipment state. The scheme uses the measurements made on the monitor wafers to determine the combination of "changes" or "perturbations" to the input settings that best explains the data. The difference between the actual settings, and the settings that best explain the data, is attributed to a change in process and equipment state. In the present version of the algorithm, the difference can either take the form of a constant gain (multiplicative) or constant offset (additive) for each controllable setting. Additionally, the residual differences between the monitor wafer measurements and predicted values, based on the new gains and offsets values in the model, are then attributed to unmodeled effects and minimized by updating the bias term for each model. The updated models are used to predict the output parameters for a given equipment setting by applying the gains and offsets as correction factors to the inputs to the models.

For example, let $y_1$, $y_2$ be two output parameters, and $x_1$, $x_2$, $x_3$ be three input parameters so that initial process models are represented as:

$$y_1 = f_1(x_1, x_2, x_3, A_1, c_1)$$

$$y_2 = f_2(x_1, x_2, x_3, A_2, c_2) \quad (1)$$

where $f_i$ represents the functional form of the model corresponding to $y_i$, $A_i$ represents the vector of coefficients in $f_i$, and $c_i$ are the bias/constant terms in $f_i$.

Let $y_1, \ldots, y_n$ be a vector of measurements made from n monitor wafers, where $y_k$ corresponds to the measurements from the kth monitor wafer, and is given by $[y_{k1}, y_{k2}]^T$.

The tuning procedure aims to determine a set of values for $x_1 = x_1'$, $x_2 = x_2'$, $x_3 = x_3'$, $c_1 = c_1'$, and $c_2 = c_2'$ such that the aggregate difference between the actual data $y_1$, $y_2$ and the corresponding predictions $f_1(x_1', x_2', x_3', A_1, c_1')$ and $f_2(x_1', x_2', x_3', A_2, c_2')$ is minimized. Suppose that the changes to variables $x_1$ and $x_3$ will be gains, whereas for variable $x_2$ it will be an offset. Equation (1) can now be rewritten as:

$$y_1 = f_1(g_1{}^*x_1, x_2 + o_2, g_3{}^*x_3, A_1, c_1 + \delta_1)$$

$$y_2 = f_2(g_1{}^*x_1, x_2 + o_2, g_3{}^*x_3, A_2, c_2 + \delta_2) \quad (2)$$

where $g_j$ is the gain corresponding to $x_j$, $o_j$ is the offset corresponding to $x_j$, and $\delta_i$ corresponds to the bias added to $c_i$.

The problem of tuning can be represented as the following sequence of weighted least squares minimization problems:

$$\min_{g_j, o_j} \frac{1}{s_1^2} \sum_{k=1}^{n} [y_{1k} - f_1(g_1{}^*x_1, x_2 + o_2, g_3{}^*x_3, A_1, c_1)]^2 + \quad (3)$$

$$\frac{1}{s_2^2} \sum_{k=1}^{n} [y_{2k} - f_2(g_1{}^*x_1, x_2 + o_2, g_3{}^*x_3, A_2, c_2)]^2$$

and $$\min_{\delta_i} \frac{1}{s_1^2} \sum_{k=1}^{n} [y_{1k} - f_1(g_1{}^{**}x_1, x_2 + o_2{}^*, g_3{}^{**}x_3, A_1, c_1 + \delta_1)]^2 + \quad (4)$$

$$\frac{1}{s_2^2} \sum_{k=1}^{n} [y_{2k} - f_2(g_1{}^{**}x_1, x_2 + o_2{}^*, g_3{}^{**}x_3, A_2, c_2 + \delta_2)]^2$$

The variables $s_1^2$ and $s_2^2$ represent the estimates of variances corresponding to the prediction errors associated with $f_1$ and $f_2$, respectively. They serve as normalizing factors for the optimization, so that the influence of errors for different parameters are weighted by their model prediction error variances. The optimal values of $g^*, o^*$, and $\delta^*$ represent the new state of the equipment. The corresponding tuned models can be written as:

$$y_1 = f_1(g_1{}^*x_1, x_2 + o_2{}^*, g_3{}^*x_3, A_1, c_1 + \delta_1{}^*)$$

$$y_2 = f_2(g_1{}^*x_1, x_2 + o_2{}^*, g_3{}^*x_3, A_2, c_2 + \delta_2{}^*) \quad (5)$$

The tuned models are used to predict the outputs $y_1$, $y_2$ from the inputs $x_1$, $x_2$, $x_3$. Wafers are processed using the updated/tuned model until a new SQC failure based on the monitor wafer measurements indicates the need for tuning.

It is often the case that the number of parameters measured on the monitor wafers (which usually correspond to the parameters to be controlled in the process) is smaller than the number of gain/offset of input parameters to be tuned. Moreover, output parameters are often correlated, making the effective number of independent variables even smaller. Therefore, if measurements are made for only a single operating-point, e.g. the identical equipment settings, then the problem of "fitting" the gains and offsets in Equation 3 becomes under-constrained. The only variation in the output is due to noise, and for stable processes the variations in the measured values of the output parameters may be very small and strongly correlated. The result is that the degrees of freedom in the output is less than the number of parameters to be tuned. In addition, the fit tends to be very localized. As a result, several, and potentially infinite, solutions become feasible and the exact solution is dependent on the starting point in the optimizer. To avoid this problem, local experiment design is executed to get observations for tuning the models. Wafers are run at the current, as well as, different settings. The settings should cause the outputs to be perturbed, increasing the effective degrees of freedom, since the gains and offsets are assumed to be the same, irrespective of the settings. Equations 3 and 4 remain essentially identical except now the optimization is done over several different settings. Equations 3 and 4 can be rewritten as:

$$\min_{g_j, o_j} \frac{1}{s_1^2} \sum_{k=1}^{n} [y_{1k} - f_1(g_1{}^*x_1{}^k, x_2{}^k + o_2, g_3{}^*x_3{}^k, A_1, c_1)]^2 + \quad (6)$$

$$\frac{1}{s_2^2} \sum_{k=1}^{n} [y_{2k} - f_2(g_1{}^*x_1{}^k, x_2{}^k + o_2, g_3{}^*x_3{}^k, A_2, c_2)]^2$$

and $$\min_{\delta_i} \frac{1}{s_1^2} \sum_{k=1}^{n} [y_{1k} - f_1(g_1{}^{**}x_1{}^k, x_2{}^k + \quad (7)$$

$$o_2{}^*, g_3{}^{**}x_3{}^k, A_1, c_1 + \delta_1)]^2 +$$

$$\frac{1}{s_2^2} \sum_{k=1}^{n} [y_{2k} - f_2(g_1{}^{**}x_1{}^k, x_2{}^k + o_2{}^*, g_3{}^{**}x_3{}^k, A_2, c_2 + \delta_2)]^2$$

where $x_j^k$ and $y_{lk}$ represents the jth process control variable and the lth product quality variable, respectively, at the settings for the kth monitor wafer. Finally, to avoid tuning to a "run-away" process, or tune to a process state significantly different from the nominal state, bounds are placed on the gains and offsets. These bounds form input constraints to the optimizations specified in Equations 6 and 7.

If there are q distinct points in the experiment design, (the current settings used to run the product wafers is usually replicated to include an estimate of measurement errors) then the degrees of freedom are potentially increased q-times that of measurements taken from wafers run at a single setting. Ideally, the experiment design should be identical to that of the design run to derive the original model. However, such a design would be too time consuming and expensive, and hence a simpler design needs to be chosen. The opposing factors in the design of experimental points are that while a large experiment design would provide uniqueness to the solution in Equations 6 and 7, the number of monitor wafers required must be minimized. The tradeoff is that a smaller design will be used locally and models will be tuned to data from the local experiment design. The design points are kept "close" to the current operating point, but far enough so that the outputs can be distinguished from the normal variations in output parameters associated with processing and measurements. The exact form of the experiment design can be determined by simulations or experimental runs.

In a PECVD Nitride process run on the AMT 5000, gains or offsets for all six controllable parameters are tuned. The monitor wafers comprise two wafers run at the current operating conditions followed by two wafers run at two different operating points close to the current point. The points are generated using the following equations:

$$x^{hi} = x^c + \alpha \times r$$

$$x^{lo} = x^c - \alpha \times r \qquad (8)$$

where
- $x^{hi}$, $x^{lo}$ are the two vectors of equipment settings generated by the experiment design,
- $x^c$ is the vector of values settings representing the current operating point,
- $r$ is the vector of range of equipment settings, and $\alpha$ is the multiplicative factor representing the "closeness" of $x^{hi}$, $x^{lo}$ to $x^c$.

If $x^{hi}$ and/or $x^{lo}$ are found to fall outside the region of allowable equipment settings, the values of $x^{hi}$ and/or $x^{lo}$ are snapped to the edge of the region of acceptability. Since the region of valid equipment settings is a hyper-box, the region can be represented by two vectors $x^H$ and/or $x^L$; and it is required that:

$$x^L \leq x^{hi} \leq x^H$$

$$x^L \leq x^{lo} \leq x^H. \qquad (9)$$

Figure 2:
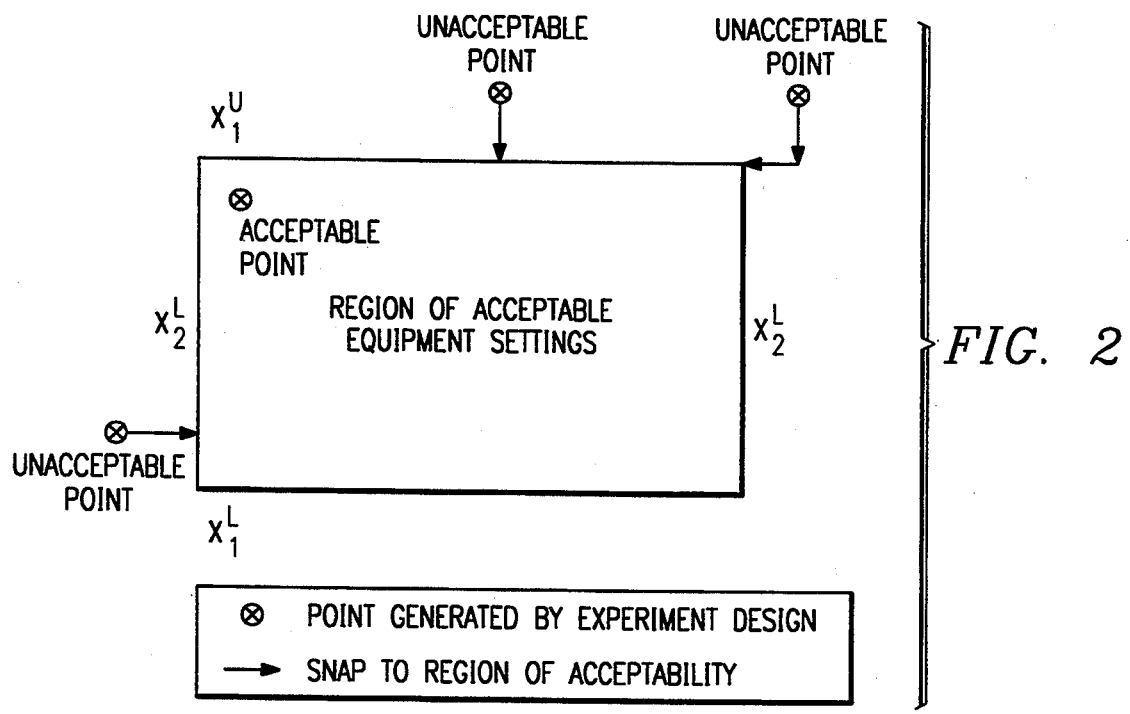
FIG. 2 is a schematic of snap to region of acceptability for local experiment design.

A simple algorithm is used to snap $x^{hi}$ and/or $x^{lo}$ to the region of acceptability: each element in the vector $x^{hi}$, $x^{lo}$ is tested against its corresponding elements in $x^H$, $x^L$, as given by Equation 9. In the case of a violation, the offending elements in $x^{hi}$ and/or $x^{lo}$ is replaced by the corresponding elements from $x^H$ or $x^L$, depending on which side of the inequality is violated. The resulting points will be termed together as the hi-lo points. FIG. 2 gives a graphical representation the procedure for snapping the hi-lo points to the region of acceptability.

TABLE 1

| Tuning Configuration for PECVD Nitride Process on AMT 5000 | | | | | |
|---|---|---|---|---|---|
| Tuning Parameters | $N_2$ | $SiH_4$ | $NH_3$ | Pressure | RF Power | Gap |
| Gain/Offset | g | g | g | o | o | o |
| Hi Tuning Limit | 1.1 | 1.08 | 1.1 | 0.5 | 20.0 | 0.005 |
| Lo Tuning Limit | 0.9 | 0.8 | 0.85 | −0.5 | −20.0 | −0.005 |

The choice of whether a gain or offset is to be tuned is determined by prior faults observed in the equipment. Typically mass flow controllers (MFCs) exhibit gain faults, whereas pressure transducer/sensors and electrode gaps exhibit offset faults. Table 1 shows the tuning configuration used in the AMT 5000.

Notice that in Equation 6 the constant terms $\delta_i$s are not tuned along with the gains and the offsets. The $\delta_i$s are tuned separately in Equation 7 based on the residuals from the corresponding $f_i$s and the monitor wafer measurements for the ith output parameter. As a result, no cross dependencies between the models are used in tuning the constant terms, and 4 monitor measurements are available per model for the AMT 5000. However, since the residuals are minimized using the result of a least-squares fit in Equation 6, the degree of freedom is reduced by 1 and therefore the resulting degrees of freedom is 3 corresponding to each $\delta_i$ that needs to be tuned. The optimizer NPSOL (Philip E. Gill, Walter Murray, Michael A. Saunders, and Margaret H. Wright, "Users's Guide for NPSOL (Version 4.0): A Fortran Package for Nonlinear Programming", Stanford University, Stanford, Calif. 94305, 1986.) is used to solve Equations 6 and 7 (other similar optimizers can be utilized as well). Multiple starts (20 points) are used to minimize the probability of ending up in a local optima; the starting points were determined by *Latin Hypercube Sampling* (R. L. Iman and M. J. Shortencarier, "A FORTRAN 77 Program and User's Guide for the Generation of Latin Hypercube and Random Samples for Use With Computer Models", *Sandia National Laboratories*, Albuquerque, N. Mex. 87185, 1984.).

Once the models are tuned, new equipment settings need to be determined to bring output parameters to target. The new process recipe is found by minimizing the difference between the model prediction and the target output values. Both input and output constraints are used; the input constraints being the region of acceptability for the equipment settings, and the output constraints being the specification limits on the output parameters. In addition, constraints had to be placed on the intermediate variables since the design of experiments for constructing the initial models of PECVD Nitride had constraints in terms of the intermediate variables and some of the input variables (intermediate variables are transformations on the input variables that may be required to facilitate process and equipment modeling). Using the convention similar to Equations 3 and 4, the optimization can be formulated as:

$$\min_{x_1, \ldots, x_6} \sum_{i=1}^{4} \frac{1}{w_i^2} [y_i^* - f_i(g_1^*, g_3^*, g_3^*, o_1^*, o_3^*, o_3^*, \delta_i^*, x_1, x_2, x_3, x_4, x_5, x_6, A_i, c_i)]^2 \qquad (10)$$

such that $$y_i^L \leq f_i(g_1^*, g_3^*, g_3^*, o_1^{\ 1}, o_3^*, o_3^*, \delta_i^*, x_1, x_2, x_3, x_4, x_5, x_6,$$

$$A_i, c_i) \leq y_i^H, i = 1, \ldots, 4; z_k^L \leq h_k(x_1, x_2, x_3, x_4, x_5, x_6) \leq$$

$$z_k^H, k = 1, \ldots 3; \text{ and } x_i^L \leq x_i \leq x_i^H, j = 1, \ldots, 6;$$

where
- $y_i^L, y_i^H$ are the low and high specification limits on the ith output, $y_i$,
- $z_k^L, z_k^H$ are the low and high specification limits on the kth intermediate variable, $z_k$,
- $x_j^L, x_j^H$ are the low and high limits on the jth input, $x_j$,
- $f_i()$ is the tuned model representing the transformation from $x_j$s to $y_i$,
- $h_k()$ is the model representing the transformation from $x_j$s to $z_k$,
- $y_i^*$ is the goal/target output value corresponding to $y_i$, and
- $w_i$ is the weighting corresponding to the ith output parameter $y_i$.

The weighted least-squares optimization in Equation 10 is performed using NPSOL. The weights $w_i$ are chosen to specify the relative importance of achieving the target values for the corresponding output parameters (for the equivalent problem in tuning, the model's prediction error standard deviations are used as weights).

Although the problem of determining the optimal settings can be solved as a single optimization, certain settings may be more controllable compared to other settings for a particular equipment and process combination. The relative controllability may be a result of reduced stability or reliability associated with changing certain settings. It is also often desirable that the new optimal settings be "close" to the current settings, since the models are tuned using local data, and it may be possible that all parameters will not have to be changed to get the process on target. To incorporate these features into determining the new settings, a procedure of sequential optimization was developed. Two features are added to the optimization procedure described by Equation 10:

1. Levels are associated with each input. The optimizer attempts to solve the problem using the variables in the lowest level. If the optimizer is unable to solve the problem using variables in the given level, it progressively proceeds to use the variables in the next level.
2. The starting point for the optimization can be set to the current settings, or to a predefined nominal setting—usually the optimal point for the untuned process.

Potentially several optimizations involving variables from different levels may be needed to determine the optimal equipment settings. All variables at level 0 are present in the optimization at all times. The algorithm starts with all the variables at level 0, constrains the variables at higher levels to be at their starting location, (a variable is constrained to remain at its starting point by setting up the constraints such that the lower and upper bounds on that variable are set to the starting value) chooses the user defined starting point, (current or nominal starting point) and then attempts to solve the reduced problem. If a solution exists, the algorithm quits. If a solution does not exist, or the optimizer gets railed on one of the constraints, the optimizer adds the variables in level 1 to its input set and retries. If a solution is not found, or the optimizer rails, the algorithm drops the variables in level 1 and proceeds to add the variables in level 2 (variables in level 0 are always present). This procedure continues until an acceptable solution is found, or else, all levels are exhausted; e.g., variables in the highest level and level 0 have been included. In such a case, all variables from all levels are used and a complete optimization, as specified in Equation 10, is run with 20 starting points generated by *Latin Hypercube Sampling*. Any nonnegative level can be associated with any variable. Levels do not have to be contiguous, nor is it necessary to have level 0. The levels are configured based on prior experience with the machine. The configuration can be changed after running the controller for some time and analyzing the data. Table 2 shows the optimization levels associated with the equipment settings on AMT 5000. All the variables, except Gap (electrode gap), have been kept at level 0 (e.g. they are free to move at all times). In the PECVD Nitride Process, it was decided that the electrode gap would be changed if, and only if, no solution could be found using the remaining five variables.

TABLE 2

Sequential Optimization Level for PECVD Nitride Process on AMT 5000

| Equipment Settings | $N_2$ | $SiH_4$ | $NH_3$ | Pressure | RF Power | Gap |
|---|---|---|---|---|---|---|
| Optimization Level | 0 | 0 | 0 | 0 | 0 | 1 |

TABLE 2-continued

The controller performance was evaluated by two methods. First, single and multiple faults were deliberately introduced in the reactor and the controller's response to these faults was observed. Second, the controller was used for routinely controlling the reactor for a period of three months. The results follow.

For single faults introduced in the reactor, one of the equipment settings was altered from the value specified by the process recipe. For multiple faults, more than one setting was altered from the process recipe. In each case, the effect of the control experiment was to simulate an equipment fault. Four monitor wafers were then processed on the reactor with the local experiment design recipe appropriately altered to reflect the fault. The controller was provided with the measurements of these four monitor wafers, and the adjusted recipe produced by the controller was used to verify the correctness of the controller actions. The impact of unmodeled effects on the controller performance was evaluated by observing the controller response to scheduled preventive maintenance performed on the reactor a number of times during the routine control of the reactor.

Figure 3:
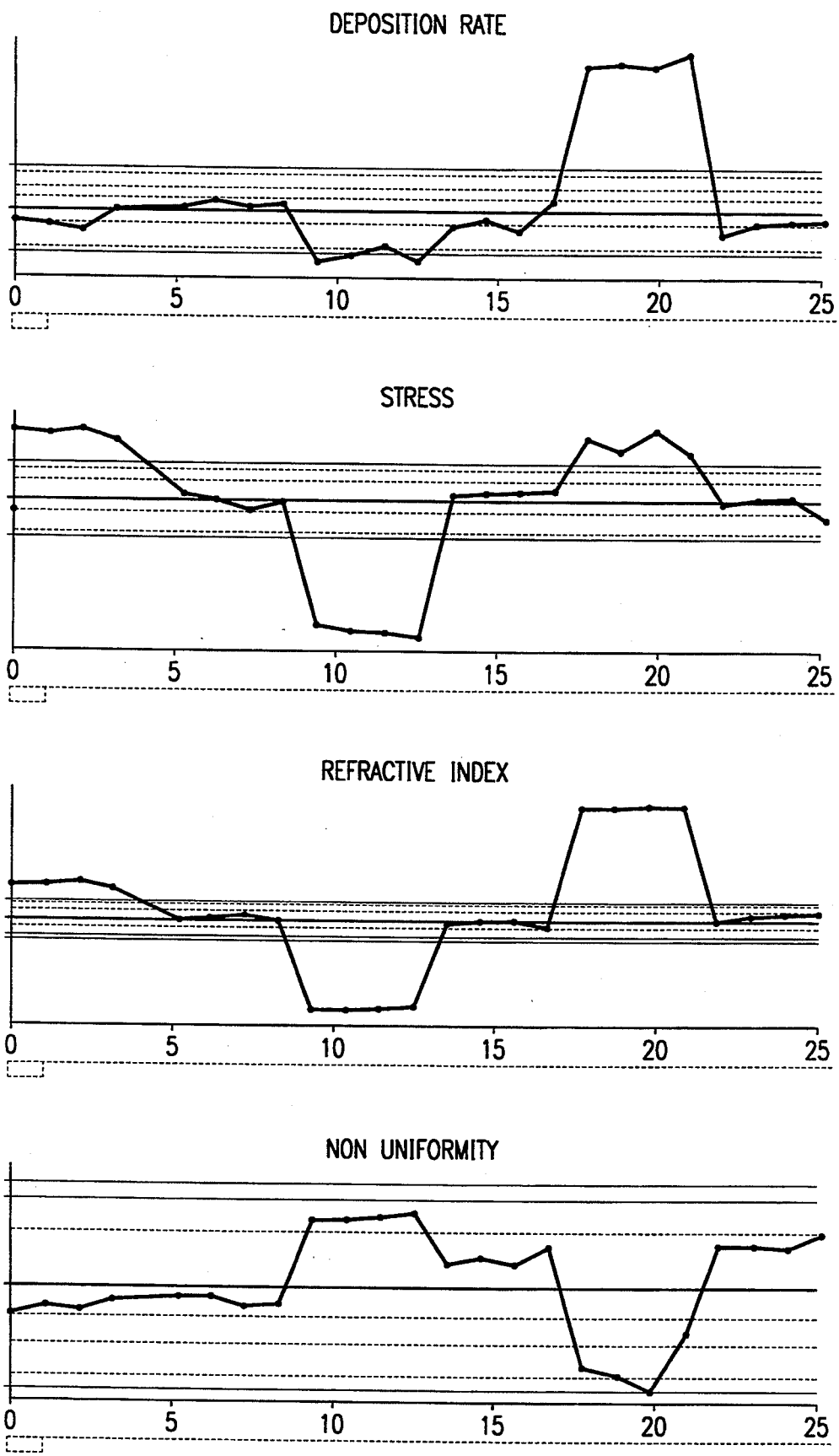
FIG. 3 is set of graphs depicting the behavior of the Monitor Based Controller under test.

FIG. 3 shows the SQC charts illustrating the behavior of the controller under test. These SQC charts are for the four quality characteristics monitored for this process. The plots show the deviation between the model prediction and the observed output. The four horizontal lines on the either side of the central line in the charts are the one sigma, the two sigma, the three sigma, and the specification limits for the process.

Points 1, 2, 3, and 4 show the process outputs when the delivered RF power is 25 W less than the power specified by the recipe. As a result of this fault, the observed film stress and refractive index go outside the specification limits. The observed deposition rate for the two replicates and the low point in the local experiment design is between one and two sigma different from the model prediction. For the high point of the design, the model prediction and observed deposition rate are close to each other.

The observations from these four points are input to the controller, which then computes the new recipe to bring the process to target. Points 5, 6, 7, and 8 show the process with the recipe produced by the controller after compensating for the above fault. In the experiments illustrated in FIG. 3, four wafers are run with the recipe computed by the controller. Like the four monitor wafers, the first two of these wafers are at the recipe computed by the controller, the third wafer is at the low setting with respect to this recipe, and the fourth wafer is at the high setting with respect to the recipe. Notice that controller action brings the stress and refractive index to be well within the specification limits, and the deviation between the model prediction and observed values is reduced for all four quality measures.

Points 9, 10, 11, and 12 are the response of the process to a multiple fault. The delivered RF power is 10 W more, and the delivered silane flow is 10% less than the values specified by the recipe. Deposition rate, stress, and refractive index go outside the specification limits. Points 13, 14, 15, and 16 show the outputs for the recipe computed by the controller after compensating for the above faults. As a result of the control action, all four quality measures are well within the specification limits.

Points 17, 18, 19, and 20 show the response of the process to another multiple fault. The silane flow was 10% higher, and the pressure was 0.25 Torr lower than the values specified by the recipe. Points 21, 22, 23, and 24 show the outputs of the process with controller computed recipe. Again the controller was able to bring the process from outside the specification limits to well within the specification limits.

Figure 4:
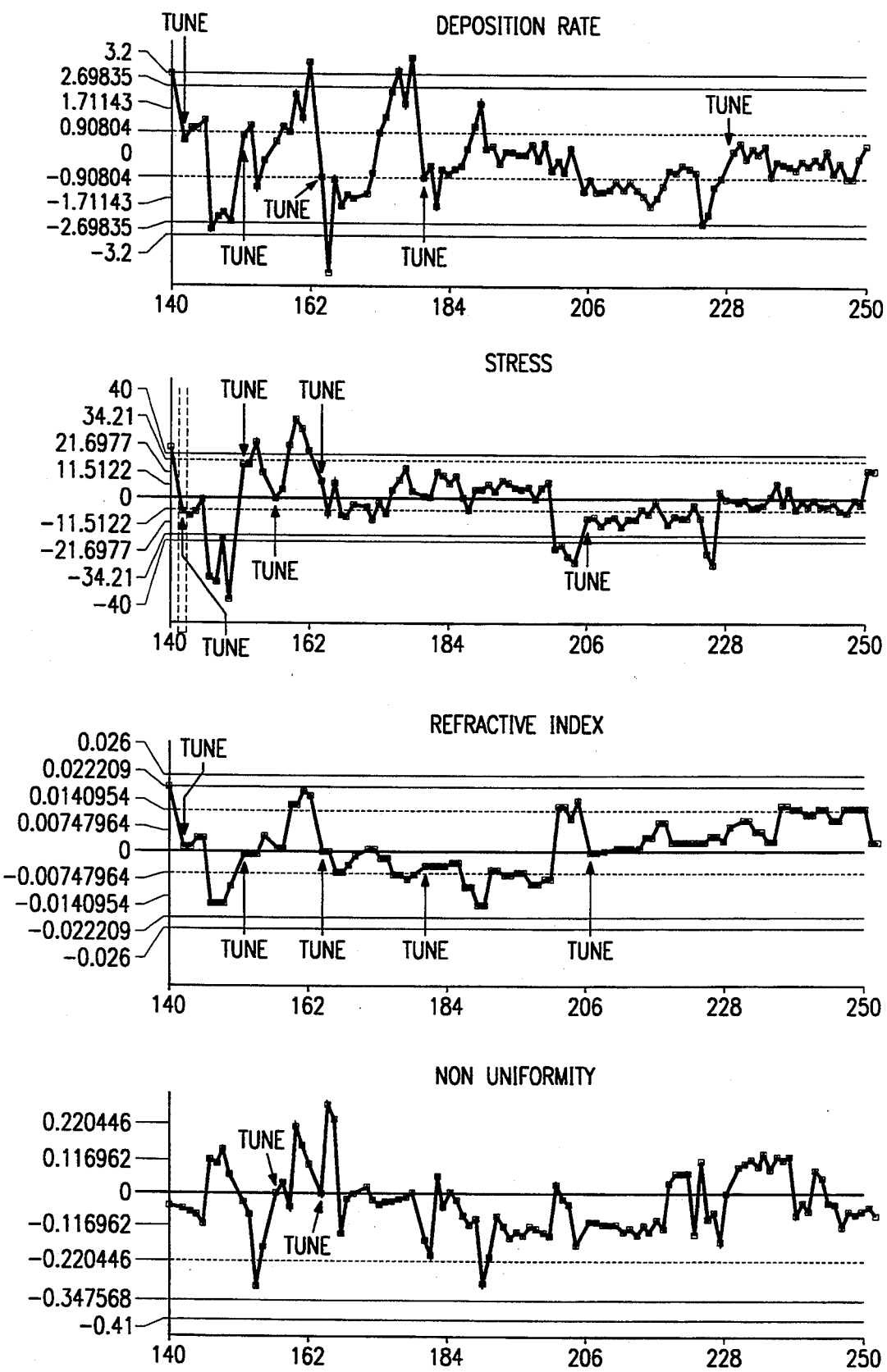
FIG. 4 is set of graphs depicting the behavior of the Monitor Based Controller with during extended operation.

An extensive evaluation of the controller was performed by using it to control the AMT 5000 reactor for over 3 months. FIG. 4 shows the segment of the SQC charts from this period. Some of the tuning events have been marked on the charts. The marked points are just after a tuning occurred. As illustrated by these marked tuning events, in every case where the process drift was large enough for one of the product quality measures to go outside the specification limit, the controller computed a new recipe to bring the product quality measures inside the specification limits. The point just after the third tuning indicated in the deposition rate chart may appear to be an exception to the above statement. However, both the point marked by the third tuning event and the point just after that were run at the identical recipe and just after each other in time. For the point marked by the third tuning event, the difference between model prediction and the observed value is approximately one sigma. Therefore, we suspect that the large difference in the deposition rate of the next wafer can be attributed to the difference in the material properties of the incoming wafer, rather than to the controller computed recipe. Furthermore, in the next two wafers which are run at the same recipe, the difference between model predictions and the observed values is again approximately one sigma.

In summary, the controller was able to adjust the recipe in response to various induced faults to bring the process outputs to be well within the specifications. Furthermore, the long term behavior of the controller, which spanned a number of preventive maintenance events, shows that the controller adjusts for unmodeled changes in the processing equipment to keep the product within specification.

Figure 5:
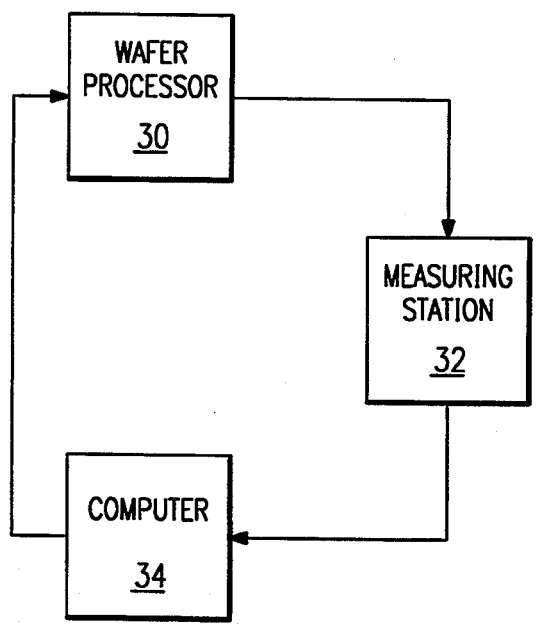
FIG. 5 is block diagram of a system for using a Monitor Wafer Based Controller.

FIG. 5 shows a possible embodiment of the invention, whereas the wafer processor 30, the measuring station 32 and the computer 34 is shown. The wafers are processed on the wafer processor 30. The measuring station 32 measures the output parameters. In addition, the measuring station 32 can be more than one station. The computer 34 can be utilized to run the controller. The computer 34 can also be utilized to run all the statistical quality control tests.

Another embodiment of the invention could have the wafer processor 30, measuring station 32, and the computer 34 all in one device.

In conclusion, the monitor based control strategy is a formalization and quantification of the methodology used to "correct" equipment settings in present day processes. The engineer usually uses a chart that provides him/her with a sensitivity of the product parameters to equipment settings at the nominal process conditions. The equipment supplier provides the nominal point as well as the sensitivity chart. The engineer uses the chart to determine the necessary corrections to the equipment settings once one, or more, parameters drift out of target. However, this procedure has two problems: first, the sensitivity is only valid for the nominal operating point, and possibly a small neighborhood of it; second, nonlinearities and cross dependencies make the corrective procedure iterative and often relies on the engineer's experience, or intuition. The monitor wafer based control strategy allows the user to perform several tasks automatically: provide an SQC mechanism to statistically determine when a correction is necessary; a mechanism for the user to update the model which he/she can use for optimizing the process as well as embedding the process/equipment state; and a methodology to perform sequential optimization that leads to the settings corrections mathematically without having to be restricted near the vendor supplied nominal point, or making multiple iterations. The user can configure the tuner and the optimizer to embed his/her knowledge and constraints to the controller. Finally, the model based SQC and checking mechanism provide a metric of goodness of control via model based SQC charts. The user has only to log the data correctly; the rest of the functions are handled by the software and can be made as invisible as the user desires. We have found from experience that the monitor based controller is intuitively appealing to the engineer, interfaces smoothly to the existing processing procedures, requires no equipment changes, and has been able to control the PECVD Nitride process on the AMT 5000 successfully.

The invention is described in reference to semiconductor wafer manufacturing, but can be applied to virtually any kind of discrete manufacturing. The process and system described is versatile and can adapt to manufacturing various products where a multitude of variables need to be controlled to produce a product with certain measurable parameters.

A few preferred embodiments have been described in detail hereinabove. The embodiments are not meant to limit the invention to the specific embodiments enclosed. The numbers used as values in the embodiments can be changed without changing the scope of the claimed invention. It is to be understood that the scope of the invention also comprehends embodiments different from those described, yet within the scope of the claims.

What is claimed is:

1. An automated system for controlling fabrication of a product, wherein said system includes a plurality of process control variables, said system comprising:
   a. sensors for measuring a plurality of quality parameters of said product;
   b. a memory for storing said plurality of quality parameters;
   c. means for administering statistical quality control tests on said plurality of quality parameters of said product;
   d. means for creating process models relating said plurality of quality parameters to said plurality of process control variables;
   e. means for analyzing said process models;
   f. means for tuning said process models so that said process models indicate which of said plurality of process control variables are in error;
   g. means for calculating new values of said plurality of process control variables by sequentially optimizing for a process goal; and
   h. means for resetting said plurality of process control variables with said new values.

2. The system of claim 1, wherein said sensors include internal sensors.

3. The system of claim 1, wherein said sensors include external sensors.

4. The system of claim 1, wherein said system includes a means for calculating new values by sequential optimization of said process models.

5. The system of claim 1, wherein said system includes a means for indicating a preference for the order in which the process control variables are to be adjusted.

6. The system of claim 1, wherein said plurality of quality parameters are weighted corresponding to their relative importance.

7. The system of claim 1, wherein said process models are tuned using process observations made at operating points determined by a local experiment design.

8. A method of controlling a plurality of process control variables in processing discrete products, said method comprising:
  a. utilizing process models relating a plurality of product quality parameters to said plurality of process control variables;
  b. measuring said plurality of product quality parameters on a first plurality of products;
  c. exercising statistical quality control tests on said plurality of product quality parameters of said first plurality of products;
  d. continuing processing if statistical quality control tests are successful; otherwise
  e. measuring said plurality of product quality parameters on a second plurality of products;
  f. tuning said process models to create tuned process models using said plurality of product quality parameters from said first and said second plurality of products, wherein said tuning estimates a changed state of said processing;
  g. estimating new values for said plurality of process control variables from said tuned models;
  h. processing a third plurality of products at said new values of said plurality of process control variables;
  i. measuring said plurality of product quality parameters on said third plurality of products;
  j. repeating said tuning of said process models and said estimating new values for said plurality of process control variables if said quality control parameters from said third plurality of products are not acceptable; otherwise
  k. continuing processing products with said new values of said plurality of process control variables if said quality control parameters from said third plurality of products are acceptable.

9. The method of claim 8, wherein said tuning process models includes local experiment design.

10. The method of claim 8, wherein said estimating new values further includes optimizing said plurality of product quality parameters.

11. The method of claim 10, wherein said optimizing includes weighting said plurality of product quality parameters corresponding to their relative importance.

12. The method of claim 8, wherein said optimizing includes indicating a preference for the order in which the process control variables are to be adjusted.

13. The method of claim 8, wherein said measuring said parameters utilizes external sensors.

14. The method of claim 8, wherein said measuring said parameters utilizes internal sensors.

15. A method of controlling a plurality of process control variables in semiconductor wafer processing, said method comprising:
  a. utilizing process models relating a plurality of product quality parameters to said plurality of process control variables;
  b. measuring said plurality of product quality parameters on a first plurality of wafers;
  c. exercising statistical quality control tests on said plurality of product quality parameters of said first plurality of wafers;
  d. continuing processing if statistical quality control tests are successful; otherwise
  e. measuring said plurality of product quality parameters on a second plurality of wafers;
  f. tuning said process models to create tuned process models using said plurality of product quality parameters from said first and said second plurality of wafers, wherein said tuning estimates a changed state of said semiconductor wafer processing;
  g. estimating new values for said plurality of process control variables from said tuned models to optimize said plurality of product quality parameters;
  h. processing a third plurality of wafers at said new values of said plurality of process control variables;
  i. measuring said plurality of product quality parameters on said third plurality of wafers;
  j. repeating said tuning of said process models and said estimating new values for said plurality of process control variables if said quality control parameters from said third plurality of wafers are not acceptable; otherwise
  k. continuing processing wafers with said new values of said plurality of process control variables if said quality control parameters from said third plurality of wafers are acceptable.

16. The method of claim 15, wherein said measuring utilizes external sensors.

17. The method of claim 15, wherein said measuring utilizes internal sensors.

18. The method of claim 15, wherein said optimizing includes indicating different combinations of said plurality of process control variables according to preference of adjustment.

19. The method of claim 15, wherein said optimizing includes weighting said plurality of product quality parameters corresponding to their relative importance.

20. The method of claim 15, wherein said tuning uses process observations made at operating points determined by a local experiment design.

* * * * *